United States Patent
Granger (10) Patent No.: US 7,614,157 B2
(45) Date of Patent: Nov. 10, 2009

(54) ARTICULATED-ARM THREE-DIMENSIONAL MEASUREMENT APPARATUS HAVING A PLURALITY OF ARTICULATED AXES

(75) Inventor: Romain Granger, Montoire (FR)

(73) Assignee: Romer, Montoire (FR)

( * ) Notice: Subject to any disclaimer, the term of this patent is extended or adjusted under 35 U.S.C. 154(b) by 242 days.

(21) Appl. No.: 11/911,816

(22) PCT Filed: Apr. 7, 2006

(86) PCT No.: PCT/FR2006/000773

§ 371 (c)(1),
(2), (4) Date: Oct. 18, 2007

(87) PCT Pub. No.: WO2006/111630

PCT Pub. Date: Oct. 26, 2006

(65) Prior Publication Data

US 2009/0139105 A1    Jun. 4, 2009

(30) Foreign Application Priority Data

Apr. 20, 2005    (FR)    .................................. 05 03947

(51) Int. Cl.
*G01B 7/008* (2006.01)
*G01B 5/008* (2006.01)

(52) U.S. Cl. ...................................................... 33/503
(58) Field of Classification Search ..................... 33/503
See application file for complete search history.

(56) References Cited

U.S. PATENT DOCUMENTS

| | | |
|---|---|---|
| 4,984,959 A | 1/1991 | Kato |
| 5,402,582 A | 4/1995 | Raab |
| 5,611,147 A | 3/1997 | Raab |
| 5,794,356 A | 8/1998 | Raab |
| 5,829,148 A | 11/1998 | Eaton |
| 5,926,782 A | 7/1999 | Raab |
| 6,817,108 B2 * | 11/2004 | Eaton ........................... 33/503 |
| 6,931,745 B2 * | 8/2005 | Granger ....................... 33/503 |

(Continued)

OTHER PUBLICATIONS

International Search Report for Serial No. PCT/FR2006/000773 dated Aug. 11, 2006.

*Primary Examiner*—Christopher W Fulton
(74) *Attorney, Agent, or Firm*—McCormick, Paulding & Huber LLP (57) ABSTRACT

The invention relates to an articulated-arm three-dimensional measurement apparatus having a plurality of articulation axes with angle encoders integrated in said arms for individually measuring the angles of rotation about each of said articulation axes. In accordance with the invention, at least one of the arms (4; 5) of the apparatus (1) includes a hollow tube (4.11; 5.11) interposed between two arm segments, one of which receives an angle encoder measuring the angle of rotation about the longitudinal axis of said arm, said hollow tube presenting at each of its ends respective abutment configurations complementary to abutment configurations at the adjacent arm segment ends so as to ensure alignment on the axis of the arm that is accurate, stable, and repeatable independently of the clamping of the abutting ends in question one against the other, coupling between said hollow tube and said arm segment being provided at said abutting ends by demountable clamping means (10) enabling the hollow tube to be replaced on site by another hollow tube of different length without it being necessary to recalibrate the entire apparatus.

12 Claims, 4 Drawing Sheets

U.S. PATENT DOCUMENTS

| | | | |
|---|---|---|---|
| 7,051,447 B2 * | 5/2006 | Kikuchi et al. | 33/503 |
| 7,269,910 B2 * | 9/2007 | Raab et al. | 33/503 |
| 2004/0040166 A1 * | 3/2004 | Raab et al. | 33/503 |
| 2005/0151963 A1 * | 7/2005 | Pulla et al. | 356/139.03 |
| 2007/0097382 A1 * | 5/2007 | Granger | 356/620 |
| 2009/0013547 A1 * | 1/2009 | Ferrari et al. | 33/503 |

\* cited by examiner

FIG_6

ARTICULATED-ARM THREE-DIMENSIONAL MEASUREMENT APPARATUS HAVING A PLURALITY OF ARTICULATED AXES

CROSS REFERENCE TO RELATED APPLICATIONS

This application is entitled to the benefit of and incorporates by reference essential subject matter disclosed in International Patent Application No. PCT/FR2006/000773 filed on Apr. 7, 2006 and French Patent Application No. 0503947 filed Apr. 20, 2005.

FIELD OF THE INVENTION

The present invention relates to an articulated-arm three-dimensional measurement apparatus having a plurality of articulation axes.

BACKGROUND OF THE INVENTION

There are very many patent documents illustrating articulated-arm three-dimensional measurement apparatuses having a plurality of articulation axes. The most recent measurement apparatuses commonly have as many as six articulation axes.

In general, articulated-arm three-dimensional measurement apparatuses conventionally include angle encoders integrated in said arm for individually measuring the angles of rotation of each of the articulation axes.

By way of example, reference can be made to the following documents: U.S. Pat. No. 5,402,582, U.S. Pat. No. 5,611,147, U.S. Pat. No. 5,794,356, U.S. Pat. No. 5,829,148, and U.S. Pat. No. 5,926,782.

Such articulated-arm three-dimensional measurement apparatuses need to be extremely accurate, and whenever action is performed on one of the arms, it is always necessary to recalibrate the entire measurement apparatus.

A large amount of effort has recently been made in an attempt to improve such three-dimensional measurement apparatuses, in order to simplify their electrical connection means and minimize the weight of each articulated arm so as to achieve better comfort during manipulation by an operator.

Thus, for example, the angle encoders associated with the articulated arms of conventional measurement apparatuses used to give rise to a very large number of electric wires being necessary for providing the connections between each encoder and an interpolation card, and then between the interpolation card and a counter, and finally between the counter and general communications means. Nowadays, because of recent developments in this field, a small card is available that performs simultaneously the interpolation, counting, and connection functions, while making use of bus cabling that is limited to five electric wires per angle encoder.

It is also increasingly desired to be able to modulate the geometry of the articulated-arm three-dimensional measurement apparatus as a function of the type of article being measured, and as a function of the space in which said article is situated while measurements are being performed. In this respect, specialists in the field have sought to be able to modify the length of one or more of the articulated arms of the three-dimensional measurement apparatus. The ability to use a shorter arm or a longer arm allows the operator to select the length of arm that is best suited to the volume of the measurement space and to the requested measurement accuracy, by optimizing a compromise between length and accuracy, given that tolerances for the parts to be measured are generally tight for small dimensions and slack for large dimensions.

The problem of replacing an arm by another arm of different length has been addressed in the field of articulated handling robots. Thus, document U.S. Pat. No. 4,984,959 describes an articulated handling robot having arms that house rotary shafts interconnected by angle transmissions. Each arm is constituted by a hollow tube interposed between two arm segments associated with the angle transmissions, with fastening being via abutting flanges that are bolted together, thereby providing mechanical coupling in rotation with the internal shafts in question. Provision is indeed made for disassembly to enable one hollow tube to be replaced by another of a different length, but it is emphasized that this is done in the factory, and that thereafter it is necessary to perform general recalibration on the three-dimensional measurement apparatus. In any event, the couplings concerned are quite unlike those of a measurement apparatus in which the articulated arms incorporate angle encoders, such that that teaching is not transposable to articulated-arm three-dimensional measurement apparatuses of the above-specified type.

The Applicant has developed an articulated-arm three-dimensional measurement apparatus with an arm in segments, the segments being assembled to one another by bolting. Such an embodiment for the arm makes disassembly possible, thereby enabling one segment to be replaced by another segment of different length, but that can be done only in the factory, it being understood that it is then always necessary to perform general recalibration of the entire three-dimensional measurement apparatus. Thus, the possibility of performing disassembly remains heavily penalized by lengthy and difficult operations of disassembly, reassembly, and general recalibration, which operations must be performed in the factory.

The Applicant has also developed another articulated-arm three-dimensional measurement apparatus in which the arms are mechanically assembled by a system of three pins disposed at 120° and engaging in corresponding V-shaped grooves, thereby creating an isostatic configuration with six points of contact so as to avoid any need to recalibrate the apparatus as a whole. Nevertheless, such a structure has been found to be very sensitive to variations in clamping force, insofar as the contact points become flattened to a greater or lesser extent by the pins, thus leading to lack of rigidity in positioning, and consequently to geometrical disalignment. Furthermore, it has been found that the arm is not sufficiently rigid while the apparatus is in use, doubtless as a result of the fragility of the contact zones, thereby leading to inaccuracy which it is difficult to remedy.

There therefore exists a need for an articulated-arm three-dimensional measurement apparatus of structure that provides great flexibility in use with a minimum of constraints, and simultaneously optimizes matching between the accuracy that is requested and the volume of the measurement space.

BRIEF SUMMARY OF THE INVENTION

The present invention thus seeks to design an articulated-arm three-dimensional measurement apparatus that does not present the above-mentioned drawbacks, and that enables assembly and disassembly to be performed quickly with a minimum of constraints, and without requiring the measurement apparatus to be returned to the factory or a workshop.

Another object of the invention is to design an articulated-arm three-dimensional measurement apparatus that is particularly well adapted to being transported in a case, with reliability that is unaffected by transport, even in the event of impacts.

In accordance with the invention, the above-specified problem is solved by an articulated-arm three-dimensional measurement apparatus having a plurality of articulation axes with angle encoders integrated in said arms for individually measuring the angles of rotation about each of said articulation axes, in which at least one of the arms of the apparatus includes a hollow tube interposed between two arm segments, one of which receives an angle encoder measuring the angle of rotation about the longitudinal axis of said arm, said hollow tube presenting at each of its ends respective abutment configurations complementary to abutment configurations at the adjacent arm segment ends so as to ensure alignment on the axis of the arm that is accurate, stable, and repeatable independently of the clamping of the abutting ends in question one against the other, coupling between said hollow tube and said arm segment being provided at said abutting ends by demountable clamping means enabling the hollow tube to be replaced on site by another hollow tube of different length without it being necessary to recalibrate the entire apparatus.

By means of such a structure, it becomes possible for the operator to perform assembly operations both quickly and repeatably, and to do so on the measurement site itself. Furthermore, the mere fact of providing a short hollow tube and a long hollow tube procures most advantageous flexibility in use, enabling the operator to take account of the volume of the space measured by a given machine, while conserving the initial accuracy of the measurement apparatus. In addition, the machine can be transported in the disassembled state in a case in a configuration that is as compact as possible and that provides with great reliability during transport. In particular, it should be observed that transport in the disassembled state preserves the reliability of the apparatus in the event of impacts, insofar as the hollow tube stowed in the case ensure that the operator has no need to perform general recalibration of the apparatus.

Preferably, each hollow tube presents, at one end, an abutment configuration of a first type, and at its opposite end, an abutment configuration of a second type complementary to the first type.

Such an arrangement makes it possible both to achieve great flexibility in use and also to avoid mounting a hollow tube the wrong way round.

Advantageously, the complementary abutment configurations are of the type having female and male flanges with a circular contact ring, and they include angle indexing means. In particular, the angle indexing means comprise an axial finger carried by one flange and an axial hole formed in the other flange.

In accordance with another particular embodiment, the demountable clamping means are constituted by hinged collars fitted over the abutting complementary flanges. In a variant, it would naturally be possible to provide for the demountable mechanical coupling to be provided by bolting together the facing flanges, however such operations are more time consuming and they also require greater care and precision, such that in practice it will be preferred to use hinged collars.

It is then preferable, for each hinged collar to present facing conical facets for coming into contact with conical outer faces of the abutting complementary flanges. In particular, each of the female and male flanges is equipped with a covering cup of outside diameter corresponding substantially to the diameter of the hinged collar.

It is also advantageous to make provision for each hollow tube to be fitted internally with an identification electronics card that is connected to an associated communications bus. This is of value in avoiding mounting errors with the hollow tubes.

Also preferably, the female and male flanges are also fitted with complementary connector members for automatically providing electrical coupling when said flanges are mechanically coupled together by the demountable clamping means.

It is then advantageous for the complementary connection members to comprise a plurality of matching contact blades. In particular, provision can be made for each flange to have an assembly restricted to five contact blades. It is then preferable for each connection assembly to include an additional contact blade for providing a signal recognizing the type of hollow tube in use.

Other characteristics and advantages of the invention appear more clearly in the light of the following description and the accompanying drawings relating to a particular embodiment.

BRIEF DESCRIPTION OF THE DRAWINGS

Reference is made to the figures in the accompanying drawings, in which.

DETAILED DESCRIPTION OF A PREFERRED EMBODIMENT OF THE INVENTION

Reference is made to FIGS. 1 to 6 to describe below in greater detail the structure of an articulated-arm three-dimensional measurement apparatus in accordance with the invention.

Figure 1:
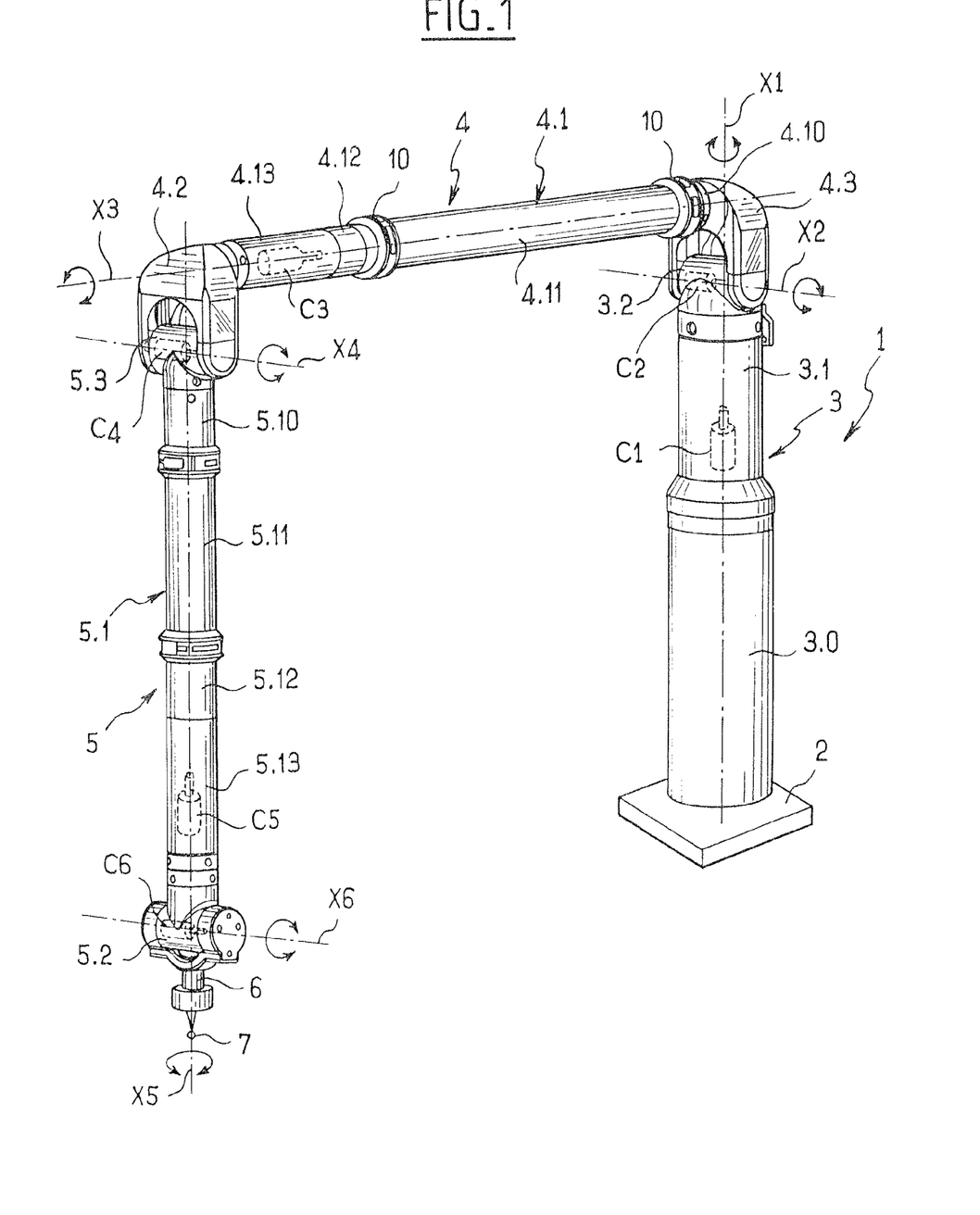
FIG. 1 is a perspective view of a articulated-arm three-dimensional measurement apparatus made in accordance with the invention, having two arms including hollow tubes.

FIG. 1 shows a articulated-arm three-dimensional measurement apparatus referenced 1, in this example of the six-axis type. Specifically, the measurement apparatus 1 comprises a support stand 2 surmounted by a cylindrical base 3.0 associated with a first rotary arm 3. The first rotary arm 3 is followed by two articulated arms 4 and 5, and a measurement sensor 7 mounted at the end of a fork-shaped articulated support 6.

The first arm 3 comprises a tubular body 3.1 of axis X1 terminated by an articulation end 3.2 capable of turning about the central axis X1. The articulation end 3.2 carries a pivoting fork 4.3 forming part of the following arm 4, which fork can pivot about an axis referenced X2. The arm 4 is connected to the pivoting fork 4.3 and comprises a tubular body 4.1 with an articulation end 4.2, here in the form of a fork, suitable for turning about the central axis of the arm 4, referenced X3. The fork 4.2 is in turn fitted with an articulation end 5.3 forming a portion of the following arm 5. The articulation end 5.3 can pivot about an axis referenced X4 of the fork 4.2 of the arm 4. The last arm 5, associated with the articulation end 5.3, has in turn a tubular body 5.1 and an articulation end 5.2, which end is capable of turning about the central axis of said arm, referenced X5. Finally, the articulation end 5.2 is fitted with a terminal fork 6 that is terminated by a measurement sensor 7. The terminal fork 6 and the associated measurement sensor 7 are mounted to pivot about an axis referenced X6 of the articulation end 5.2 of the arm 5.

It can thus be seen that there are six articulation axes present that are referenced X1, X2, X3, X4, X5, and X6. This is thus a so-called six-axis measurement arm. The invention is nevertheless not limited in any way to this particular number of axes, and it is equally possible to provide a machine having seven axes or even more.

The angles of rotation about each of the six axes are measured individually by associated angle encoders integrated in the corresponding portions of the moving arms, these encoders being referenced herein C1, C2, C3, C4, C5, and C6 in association with the corresponding axes X1, X2, X3, X4, X5, and X6.

In general, the structure of the measurement apparatus 1 as described above conforms completely with prior traditional embodiments of articulated-arm three-dimensional measurement apparatuses.

In accordance with a characteristic aspect of the invention, at least one of the arms 4, 5 of the apparatus 1 includes a hollow tube interposed between two arm segments, one of which receives an angle encoder measuring the angle of rotation about the longitudinal axis X3, X5 of said arm. In addition, at each of its ends, the hollow tube in question presents an abutment configuration complementary to the abutment configurations at the ends of the adjacent arm segments so as to ensure accurate, stable, and repeatable alignment on the axis of the arm independently of the clamping of the abutting ends concerned one against another, with coupling between said hollow tube and said arm segment being provided at said abutting ends by releasable clamping means, referenced 10, that make it possible on-site to replace the hollow tube with another hollow tube of different length without it being necessary to recalibrate the apparatus as a whole.

Specifically, a hollow tube is provided for each of the arms 4 and 5 of the apparatus, thus making it possible to make best use of the flexibility in use that is achieved by such demountability. Nevertheless, it can be possible to provide only a single hollow tube in only one of the arms where the intended utilization makes that possible.

Thus, and in accordance with a characteristic of the invention, the tubular body 4.1 of the arm 4 includes a hollow tube 4.11 interposed between two arm segments, one of which receives the angle encoder C3 measuring the angle of rotation about the longitudinal axis X3. Specifically, the arm segment 4.10 forms an integral portion of the fork 4.3, while the other arm segment includes a portion 4.13 that is rigidly secured to the fork 4.2 and that contains the angle encoder C2, and a complementary portion 4.12 capable of turning relative to the portion 4.13 about the axis X3, said complementary portion 4.12 here being coupled to the hollow tube 4.11. The coupling between the hollow tube 4.11 and the arm segments 4.10 at one end, and 4.12, 4.13 at the other end is provided at the abutting ends by releasable clamping means, here referenced 10, that are made specifically in the form of hinged collars, described in greater detail below with reference to FIGS. 3 and 4.

In the same manner, the tubular body 5.1 of the arm 5 includes a hollow tube 5.11 that is interposed between two arm segments, one of which receives the angle encoder C5 measuring the angle of rotation about the longitudinal axis X5 of said arm. Specifically, the hollow tube 5.11 is interposed between a segment 5.10 that is rigidly secured to the articulation end 5.3 of the arm 5, and a portion 5.12 that is connected to the portion 5.13 housing the angle encoder C5, and capable of turning relative thereto about the axis X5. Here again, the coupling between the hollow tube 5.11 and the two arm segments in question is provided at abutment ends by releasable clamping means 10, here embodied in the form of hinged collars identical to those used for the hollow tube 4.11 of the arm 4.

Figure 2:
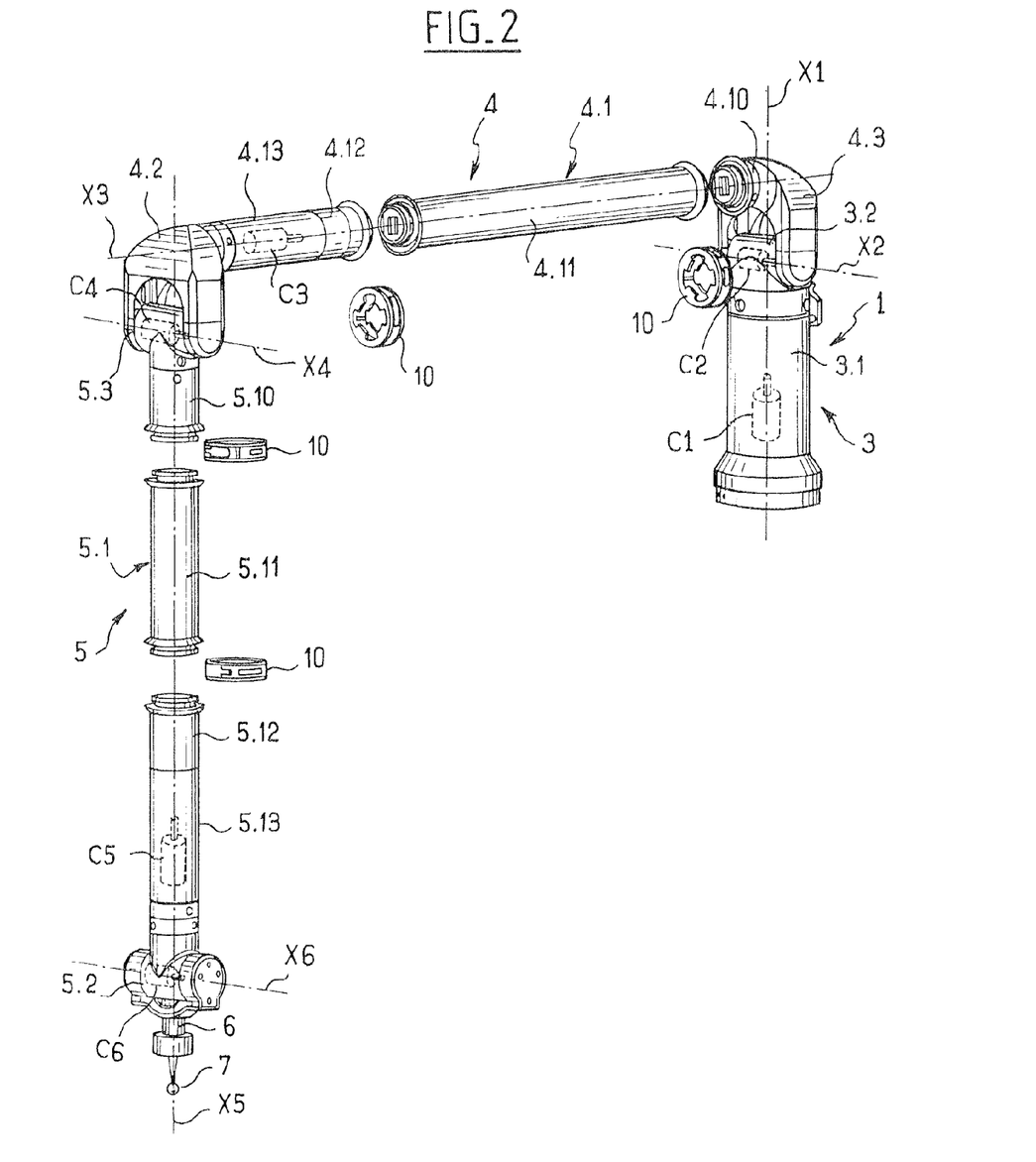
FIG. 2 is a view analogous to FIG. 1, showing the arms with their components separated, so as to show clearly the presence of two hollow tubes and of associated releasable clamping means, specifically means implemented in the form of hinged collars.

As shown in FIG. 2, when the hinged collars are released, the arms 4 and 5 of the measurement apparatus take on the form of separate components that are compact, and thus easily stowed in a transport case.

More importantly, the hollow tubes 4.11 and 5.11 can be selected from a plurality of available hollow tubes solely on the criterion of the length of the hollow tube. This selection by length is performed by the operator as a function of the type of work that is to be performed, and thus of the measurement space in question. It will immediately be understood that such a structure presents a considerable advantage in terms of flexibility of utilization, insofar as it is possible, on the actual measurement site, for the operator to release the two hinged collars in question rapidly so as to demount the hollow tube that is present and replace it by another hollow tube of a different length that is better suited to the type of measurement in question. In order to achieve mechanical coupling, and as explained below electrical coupling also, it suffices for the operator to put the hinged collars back into place, and there is no need to proceed with recalibration of the entire measurement apparatus. All this is made possible by a particular arrangement for the complementary abutment configurations that make it possible to guarantee accurate and stable alignment on the axis of the arm independently of the clamping of the corresponding abutting ends one against the other.

Figure 3:
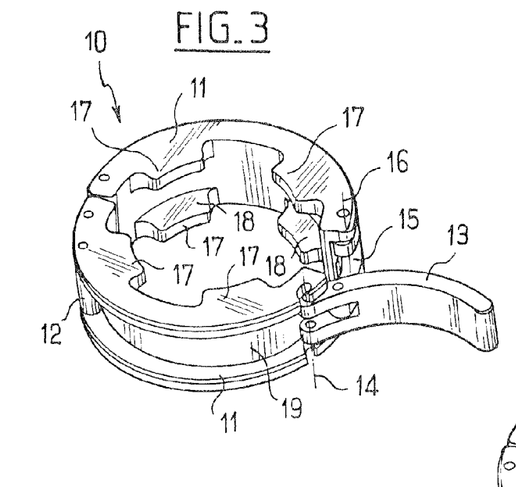
FIGS. 3 and 4 are perspective views of one of the above-mentioned hinged collars, respectively in a position before clamping and a position after clamping.
Figure 4:
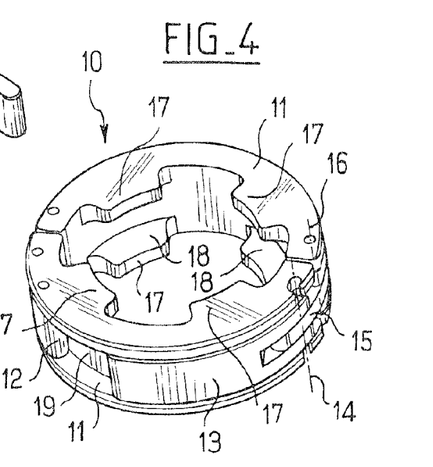

FIGS. 3 and 4 show a hinged collar 10 for providing mechanical coupling, and thus also electrical coupling, between the abutting ends of a hollow tube and of an arm segment.

Specifically, each hinged collar 10 comprises two components that are hinged together by a part 12, each presenting two superposed half-rings 11 for fitting over the abutting elements. A hinged lever 13 enables the collar 10 to be opened or closed. The lever 13 is connected in hinged manner to a curved link 15 that is itself hinged at 16 to one of the components of the collar, in permanent manner. The same lever 13 is hinged at 14 to the other component of the collar 10, in separable manner so as to make it possible to open the collar. Each complete ring 11 presents clamping tongues 17, here four in number, having facing inside facets 18 that are arranged to be slightly conical. These conical facets 18 come into contact with conical outside faces of complementary abutting flanges. It should also be observed that there is a recess 19 serving to receive the lever 13 in the closed position of the collar, as shown in FIG. 4.

There follows a description in greater detail of the structure of two abutting ends, one forming a portion of a hollow tube, and the other forming a portion of an associated arm segment. In these figures, there is shown only one end of a hollow tube 4.11 and one end of a portion 4.12 of the associated arm segment, it being understood that the same arrangement is to be found not only at the other end of the hollow tube 4.11, but also with the other hollow tube 5.11 associated with the arm 5.

In this respect it is appropriate to observe that it is advantageous to provide for each hollow tube 4.11 or 5.11 to present, at one end, an abutment configuration of a first type, and at its opposite, other end, an abutment configuration of a second type that is complementary to the first type. Although this design is not essential in any way, it makes it possible to avoid errors in positioning a hollow tube that would otherwise lead to the abutment configurations and/or the associated connection members being wrongly presented.

Figure 5:
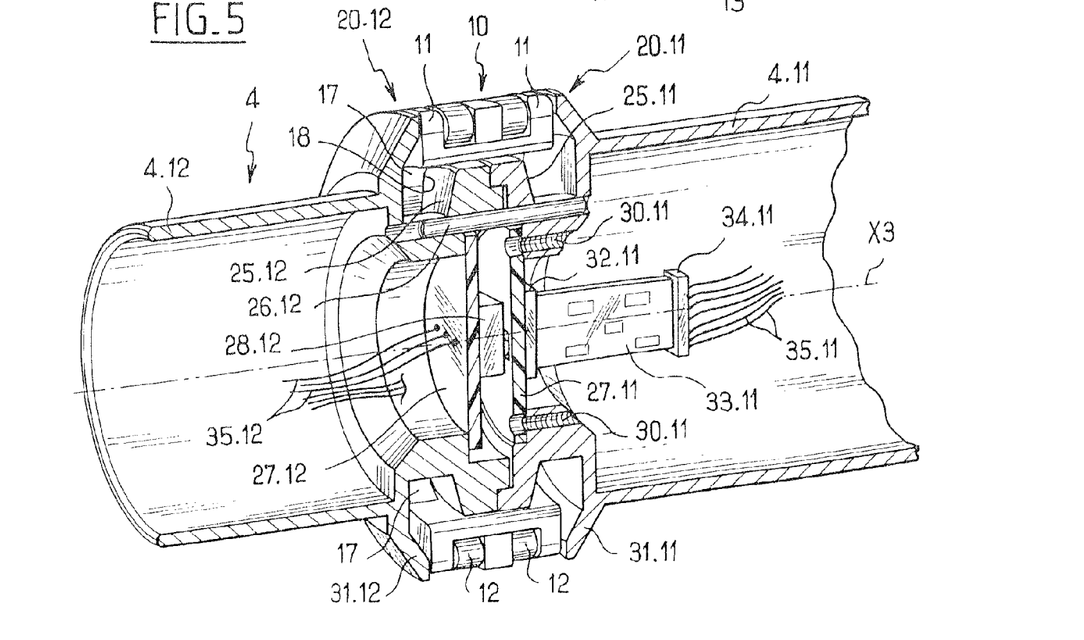
FIG. 5 is a fragmentary perspective view of two complementary abutment configurations, showing both the mechanical coupling achieved by the hinged collar, and the electrical coupling provided by complementary connection members having matching contact blades.
Figure 6:
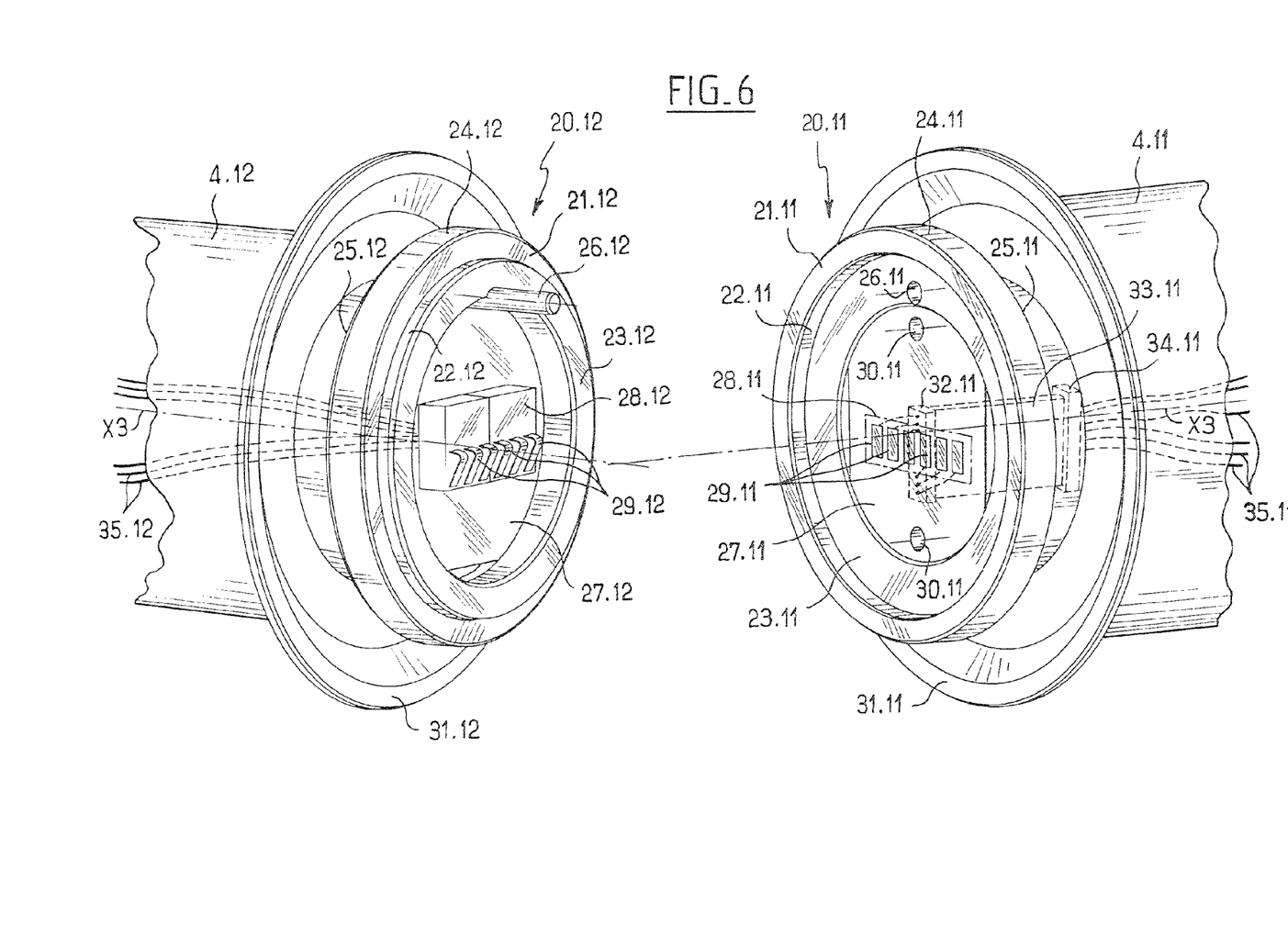
FIG. 6 is a perspective view of the junction between two complementary abutment configurations when in the open state, showing more clearly the mechanical and electrical coupling members involved.

As visible in FIGS. 5 and 6, the complementary abutment configurations are of the male and female flange type. Specifically, the female flange 20.11 is provided on the hollow tube 4.11 and the male flange 20.12 is provided on the portion 14.2 of the arm segment, but it would naturally be possible to provide an opposite disposition.

The female flange 20.11 comprises a circular outer bearing ring 21.11 that is connected to a cylindrical portion 22.11, and then to a new circular ring 23.11. On the male flange 20.12, there is a circular ring 21.12 for coming into bearing contact against the ring 21.11 of the flange 20.11, and then a cylindrical male portion 22.12 terminated by a ring 23.12. When the two abutting ends are moved towards each other along the common axis of the arm (here the axis X3), the facing rings 21.11 and 21.12 are caused to bear against each other, while simultaneously aligning the axis X3 of the arm by means of the cylindrical surfaces 22.11 and 22.12 that become mutually engaged. The rings 23.11 and 23.12 are adjacent, but they are not in bearing contact.

Angle indexing means are also provided, specifically constituted by an axial finger 26.12 that is carried by one flange (here the male flange 20.12), and an axial hole 26.11 that is formed in the other flange (here the female flange 20.11). A small amount of clearance may be provided by overdimensioning the axial hole 26.11 so as to avoid any risk of jamming during mounting or demounting due to the angle index. As explained below, simple recalibration associated with turning about the axis of the arm, specifically the axis X3, can suffice after a new hollow tube 4.11 has been remounted.

As more clearly visible in FIG. 5, the male and female flanges 20.11, 20.12 present conical outer faces 25.11, 25.12 that come into contact with the facing conical facets 18 of the hinged collar 10 in question. It can readily be understood that clamping the hinged collar 10 serves to achieve perfect contact between the bearing rings 21.11 and 21.12 associated with very accurate alignment on the axis X3 of the arm. It should also be observed that covering cups 31.11 and 31.12 are present on the female and male flanges 20.11 and 20.12, the outside diameter of the cups corresponding substantially to the diameter of the hinged collar 10. As can be seen in FIG. 5, in the coupling position, with the collar closed, there exists only a very small amount of extra thickness in the abutting zones, and there is no risk of external contaminating agents penetrating and possibly affecting the electrical connection members as described below.

The female and male flanges 20.11 and 20.12 are also fitted with complementary connection members that automatically provide electrical coupling when said flanges are mechanically coupled together by the releasable clamping means 10.

Specifically, the complementary connection members comprise a plurality of matching contact blades. Thus, for the male flange 20.12, there can be seen a plate 27.12 carrying two connector blocks 28.12 fitted with flexible contact blades 29.12. On the other abutment end, there can be seen a plate 27.11 fitted with a flat connector 28.11 presenting flat contact blades 29.11 for co-operating with the matching flexible contact blades 29.12.

Each flange 20.11, 20.12 is here provided with an assembly that is restricted to five contact blades 29.11, 29.12 for providing connection of the associated communications bus that is here constituted by wires 35.11, 35.12. Specifically, the bus used is made up of five wires (which is naturally merely an example), two of which supply power, two transfer data, and one transfers events. It may also be advantageous to provide for each connection assembly to have an additional contact blade for providing a signal for recognizing the type of hollow tube in use. The associated sixth wire thus serves, in the absence of mechanical keying means, to provide an accurate indication that can be perceived immediately by the operator about the type of hollow tube in use, and in particular concerning its length. This additional information serves to avoid erroneous mounting of a hollow tube, with such erroneous mounting being signaled immediately to the operator by a message issued by the controlling computer that is associated with the apparatus.

It is also advantageous to provide for each hollow tube to be fitted internally with an electronic identification card that is connected to the associated communications bus, thus making it possible to ensure that the correct hollow tube has been put into place to obtain the desired arm length. Thus, in FIG. 5, there can be seen an assembly carried by the plate 27.11 of the hollow tube 4.11, which assembly comprises a connector 32.11 bringing together the connections to the flat contact plates 29.11, an electronic card 33.11 connected to the connector 32.11, a connector 34.11 mounted to the other end of the electronic card 33.11, and six wires 35.11 of the communications bus extending from said connector.

Finally, it should be observed that there are passages 30.11 associated with the mechanical means for fastening the plate 27.11 on the associated flange.

After each change of hollow tube, and before restarting operation, there is no need to recalibrate the entire apparatus, since the remainder of the apparatus has already been calibrated in the factory for the new length of hollow tube. The only calibration operation that the operator therefore needs to perform is calibration associated with the encoder of the arm in question. Such calibration is easy to perform and in reality takes very little time. It suffices to place the sensor 7 in an available conical hole, and then to cause the arm to turn about the hole while adjusting the offset of the encoder so as to obtain a point in three dimensions that is as constant as possible. That amounts to a mere computer adjustment, which is performed very quickly without it being necessary to use any particular tool, and it can naturally be performed on the same site as the measurement.

This thus provides a three-dimensional measurement apparatus that is of modular design, with the ability to be mounted and demounted both quickly and repeatably. The operator can substitute hollow tubes on the measurement site itself without needing to proceed with any general recalibration of the apparatus, because of the accurate, stable, and above all repeatable alignment on the axis of the arm that is obtained by the complementary abutment configurations. When a plurality of hollow tube lengths are available, in particular a short length and a long length, the measurement apparatus of the invention provides best matching between the measurement accuracy desired and the volume of the measurement space.

In addition to length being modular, the structure of the measurement apparatus of the invention provides considerable advantages in terms of transporting the apparatus. Disassembly enables the apparatus to be stowed in a small transport case, and the occurrence of impacts against the case has no effect on the machine in the disassembled condition. In this context, it should be observed that transporting in the disassembled state does not lead to any loss of calibration in the event of the case being dropped, since the hollow tubes stored in the case are inert components, so reliability is not affected in any way.

Finally, the modular design also provides major advantages in terms of maintenance, insofar as it suffices to change a possibly damaged subassembly while conserving the remaining components of the measurement apparatus.

The invention is not limited to the embodiment described above, but on the contrary covers any variant using equivalent means to reproduce the essential characteristics specified above.

What is claimed is:

1. An articulated-arm three-dimensional measurement apparatus having a plurality of articulation axes with angle encoders integrated in said arms for individually measuring the angles of rotation about each of said articulation axes, wherein at least one of the arms of the apparatus includes a hollow tube interposed between two arm segments, one of which receives an angle encoder measuring the angle of rotation about the longitudinal axis of said arm, said hollow tube presenting at each of its ends respective abutment configurations complementary to abutment configurations at the adjacent arm segment ends so as to ensure alignment on the axis of the arm that is accurate, stable, and repeatable independently of the clamping of the abutting ends in question one against the other, coupling between said hollow tube and said arm segment being provided at said abutting ends by demountable clamping means enabling the hollow tube to be replaced on site by another hollow tube of different length without it being necessary to recalibrate the entire apparatus.

2. The apparatus according to claim 1, wherein each hollow tube presents, at one end, an abutment configuration of a first type, and at its opposite end, an abutment configuration of a second type complementary to the first type.

3. The apparatus according to claim 1, wherein the complementary abutment configurations are of the type having female and male flanges with a circular contact ring, and they include angle indexing means.

4. The apparatus according to claim 3, wherein the angle indexing means comprise an axial finger carried by one flange and an axial hole formed in the other flange.

5. The apparatus according to claim 3, wherein the female and male flanges are also fitted with complementary connector members for automatically providing electrical coupling when said flanges are mechanically coupled together by the demountable clamping means.

6. The apparatus according to claim 5, wherein the complementary connection members comprise a plurality of matching contact blades.

7. The apparatus according to claim 6, wherein each flange is provided with an assembly restricted to five contact blades.

8. The apparatus according to claim 7, wherein each connection assembly includes an additional contact blade making it possible to provide a signal recognizing the type of hollow tube in use.

9. The apparatus according to claim 1, complementary abutment configurations are of the type having female and male flanges with a circular contact ring, and they include angle indexing means, and wherein the demountable clamping means are constituted by hinged collars fitted over the abutting complementary flanges.

10. The apparatus according to claim 9, wherein each hinged collar presents facing conical facets for coming into contact with conical outer faces of the abutting complementary flanges.

11. The apparatus according to claim 10, wherein each of the female and male flanges is equipped with a covering cup of outside diameter corresponding substantially to the diameter of the hinged collar.

12. The apparatus according to claim 1, wherein each hollow tube is fitted internally with an identification electronics card that is connected to an associated communications bus.

* * * * *